United States Patent
Le Rouzic et al.

(10) Patent No.: US 10,855,653 B2
(45) Date of Patent: Dec. 1, 2020

(54) METHOD AND DEVICE FOR MAINTAINING TRANSPORT ADDRESS ASSOCIATIONS FOR AN ADDRESS TRANSLATION ENTITY

(71) Applicant: Orange, Paris (FR)

(72) Inventors: Jean-Claude Le Rouzic, Trébeurden (FR); José Doree, Lannion (FR)

(73) Assignee: ORANGE, Paris (FR)

( * ) Notice: Subject to any disclaimer, the term of this patent is extended or adjusted under 35 U.S.C. 154(b) by 177 days.

(21) Appl. No.: 15/539,097

(22) PCT Filed: Dec. 18, 2015

(86) PCT No.: PCT/FR2015/053624
§ 371 (c)(1),
(2) Date: Jun. 22, 2017

(87) PCT Pub. No.: WO2016/102841
PCT Pub. Date: Jun. 30, 2016

(65) Prior Publication Data
US 2017/0353429 A1 Dec. 7, 2017

(30) Foreign Application Priority Data
Dec. 23, 2014 (FR) ..................... 14 63211

(51) Int. Cl.
*H04L 29/12* (2006.01)
*H04L 29/06* (2006.01)
(52) U.S. Cl.
CPC ...... *H04L 61/2564* (2013.01); *H04L 65/1006* (2013.01); *H04L 65/1016* (2013.01); *H04L 65/1073* (2013.01)

(58) Field of Classification Search
None
See application file for complete search history.

(56) References Cited

U.S. PATENT DOCUMENTS 7,975,058 B2 * 7/2011 Okmianski ......... H04L 29/1249
370/389
9,648,073 B2 * 5/2017 Kafle ..................... H04L 65/80
(Continued)

OTHER PUBLICATIONS

Rosenberg et al., "Session Traversal Utilities for NAT (STUN)", RFC 3489, Oct. 2008 (Year: 2008).*
(Continued)

*Primary Examiner* — Jenkey Van
(74) *Attorney, Agent, or Firm* — Knobbe, Martens, Olson & Bear, LLP

(57) ABSTRACT

A method of maintaining transport address associations in a transport address translation entity connected in series between a first device and a second device is disclosed. The first device can use a first transport protocol to send a first message to cause the transport address translation entity to make a first association of a first public address with a first private address. On receiving a response to the first message from the second device, the first device can use a second transport protocol to send a second message to cause the transport address translation entity to make a second association of a second private address with a second public address and with the second transport protocol. The second message can contain correspondence information that is also contained in the first message and/or in the response to the first message.

20 Claims, 4 Drawing Sheets

(56) References Cited

U.S. PATENT DOCUMENTS

| | | | |
|---|---|---|---|
| 2007/0140159 A1* | 6/2007 | Eronen | H04L 12/12 370/328 |
| 2007/0180081 A1* | 8/2007 | Okmianski | H04L 29/1249 709/223 |
| 2009/0103540 A1* | 4/2009 | Froment | H04L 29/125 370/392 |
| 2009/0157887 A1 | 6/2009 | Froment et al. | |
| 2015/0016446 A1* | 1/2015 | Scott | H04L 65/1006 370/352 |
| 2015/0127853 A1* | 5/2015 | Roskind | H04L 61/2503 709/245 |

OTHER PUBLICATIONS

International Search Report and Written Opinion dated Mar. 18, 2016 for Application No. PCT/FR2015/053624.

Jennings, et al., Managing Client Initiated Connections in the Session Initiation Protocol SIP draft-ietf-sip-outbound-06, Nov. 22, 2006.

Gurbani, et al., Handling Large User Datagram Protocol (UDP) Responses in the Session Initiation Protocol (SIP) draft-gurbani-sip-large-udp-response-00, Oct. 3, 2006.

* cited by examiner

METHOD AND DEVICE FOR MAINTAINING TRANSPORT ADDRESS ASSOCIATIONS FOR AN ADDRESS TRANSLATION ENTITY

RELATED APPLICATIONS

This application is the U.S. National Phase of Application No. PCT/FR2015/053624 entitled "METHOD AND DEVICE FOR MAINTAINING TRANSPORT ADDRESS ASSOCIATIONS FOR AN ADDRESS TRANSLATION ENTITY" filed Dec. 18, 2015, which designated the United States, and which claims the benefit of French Application No. 1463211 filed Dec. 23, 2014.

BACKGROUND OF THE INVENTION

The invention relates to the general field of telecommunications. It relates more particularly to a mechanism for configuring an address translation entity or "network address translation" (NAT) entity placed in series between two devices (e.g. a terminal and a server) in a telecommunications network.

In known manner, a NAT entity or respectively a "network address and port translation" (NAPT) entity, is an entity that associates a "private" (or internal) network address or respectively transport address of one of the devices with a "public" (or external) network address or respectively transport address, and that proceeds to translate the private address into the public address and vice versa on detecting a message containing the private address or respectively the public address. The term "transport address" is used herein of a device to mean the combination of an Internet protocol (IP) address and a port, which together identify the device at transport level. Each association of a private address with a public address is made for a given mode of transport, i.e. a given transport protocol. By way of example, such a protocol is transmission control protocol (TCP), user datagram protocol (UDP), or stream control transmission protocol (SCTP).

Such a NAT or NAPT entity is commonly used to protect telecommunications networks, and in particular telecommunications networks using the session initiation protocol (SIP) as standardized by the Internet engineering task force (IETF) as described in the document RFC 3261 published by the IETF and entitled "SIP session initiation protocol", June 2002. By way of example, such a network is a voice over long-term evolution (LTE) network, also known as a VoLTE network, a video over-LTE (ViLTE) network, etc., that relies on an IP multimedia subsystem (IMS) architecture as defined by the Third Generation Partnership Project (3GPP) standard. In such networks, an NAPT entity can be used in series between the terminals and the entry point into the IMS core network of the operator, also known as a proxy call session control function (P-CSCF), with which the terminals are registered in order to be able to access the services made available by the core network. It makes it possible to accept, or on the contrary to refuse, certain streams depending on rules specific thereto, e.g. as a function of the source transport address used for transporting the streams. It is common practice to consider that streams coming from terminals are authorized and lead to a "pinhole" being opened on the NAT entity, where a pinhole is identified by associating various pieces of information, namely a private transport address (including an IP address and a port), a public transport address, and a transport mode (protocol). In other words, pinholes are created on the NAT entity in response only to messages sent in the terminal-to-core-network direction (or in the access-network-to-core-network direction), with it not being possible for any pinhole to be created in the opposite core-network-to-terminal direction.

Nowadays, mobile terminals are hosting more and more applications that communicate via one or more operator networks, including in particular rich communication services (RCS) applications or applications derived from RCS technology such as personalized SMS/MMS applications, VoLTE, etc.

In order to operate, such applications need to register with the operator's core network. For this purpose, a SIP REGISTER registration request is sent by the terminal to the P-CSCF server. The size of this registration request depends on the number of applications requesting connectivity with the network: specifically, each application corresponds to one or more multimedia characteristics (also known as "feature tags") that enrich the content of a Contact field in the SIP REGISTER request sent by the terminal. Consequently, the greater the number of applications seeking to register with the core network, the longer the Contact field in the request, and thus the longer the SIP REGISTER request itself.

The SIP standard requires devices that implement this protocol (i.e. in particular terminals and core network entities such as the P-CSCF server) to support both the UDP and the TCP transport protocols. Nevertheless, by default, most terminals nowadays make use of the UDP transport protocol, in particular for reasons of low complexity. The SIP standard nevertheless provides that when a SIP request exceeds a certain size, then the devices implementing the SIP protocol must use the TCP transport protocol for transporting the request, in particular in order to limit any risk associated with UDP packets becoming fragmented. In other words, a device that is configured by default to use a UDP transport mode (or protocol) needs to switch over to a TCP transport mode if it desires to transmit a SIP request of size greater than a determined threshold. The threshold is defined in the document RFC 3261 (Chapter 18.1.1) published by the IETF as being 1300 octets (8-bit bytes).

This mode of operation imposed by the SIP standard can give rise to various problems in the presence of a NAT entity between a terminal and a P-CSCF server.

More precisely, if it is assumed by way of example that a terminal registers with the core network using the UDP transport mode, then it sends to the P-CSCF server a SIP REGISTER request having as its source transport address a private transport address @IPpriv_UDP and conveyed (transported) in compliance with the UDP protocol. This request is intercepted by the NAT entity, which associates the address @IPpriv UDP with a public transport address @IPpub_UDP, and thus opens a pinhole for the terminal for the UDP protocol. Thereafter, the NAT entity transfers the SIP REGISTER request from the terminal to the P-CSCF server, with this transport address @IPpub_UDP as the source address.

Now assume that a request coming from the P-CSCF server and destined for the terminal exceeds the maximum size authorized for using the UDP protocol. In compliance with the SIP standard, the P-CSCF server must send this request to the terminal using the TCP transport terminal. Unfortunately, no entity (and in particular neither the P-CSCF server nor the NAT entity) has available an association of public and private transport addresses for this TCP transport mode for the terminal (i.e. no open pinhole) since the terminal is registered for the UDP transport protocol. Consequently, the request from the P-CSCF server cannot be transmitted in this context to the terminal.

Another problem can also arise in the uplink direction (i.e. from the terminal to the network).

For example, assume that the number of applications hosted by a terminal seeking to register is such that the terminal must switch to a TCP transport mode even though it is configured by default to use the UDP transport mode. In this context, the SIP REGISTER request sent by the terminal to the P-CSCF server might indicate in the Contact field of the header an address of contact (AoC) that can be reached in UDP mode, even though the SIP REGISTER request is transported using the TCP protocol.

At the NAT entity, on receiving such a SIP REGISTER request, a pinhole is opened for the TCP transport mode, but no pinhole is opened for the UDP transport mode, even though the terminal is seeking to receive requests from the network over an address that is reachable in UDP mode.

Consequently, if the NAT entity receives a request destined for the terminal, coming from the P-CSCF server, and sent using the UDP mode, the NAT entity is incapable of processing the request. Specifically, no UDP pinhole is open at the NAT entity for passing this request, and as mentioned above, a request coming from the core network is not suitable for triggering such opening of a pinhole. As a result, the P-CSCF server receives no response to its request from the terminal.

OBJECT AND SUMMARY OF THE INVENTION

In order to mitigate these drawbacks, the invention provides in particular a method of maintaining transport address associations in a transport address translation entity connected in series between a first device and a second device, the method being for performing by the first device, and comprising:

a sending step of using a first transport protocol to send a first message having a first "private" transport address to the second device, this first message being suitable for causing the transport address translation entity to make a first association of a first "public" address with the first private address and with the first transport protocol; and on receiving a response to the first message coming from the second device, a sending step of using a second transport protocol to send a second message having a second private transport address to the second device, the second message being suitable for causing the transport address translation entity to make a second association of said second private address with a second "public" address and with the second transport protocol, the second message further containing "correspondence" information that is also contained in the first message and/or in the response to the first message, and that is suitable, once the second device has received the second message, for causing the second public transport address to be put into correspondence with the first public transport address.

Correspondingly, the invention also provides a "first" device comprising:

a first send module that is configured to use a first transport protocol to send a first message having a first "private" transport address to a second device, this first message being suitable for causing a transport address translation entity placed in series between said first device and said second device to make a first association of a first "public" address with the first private address and with the first transport protocol; and a second send module that is activated on reception of a response to the first message coming from the second device, and that is configured to use a second transport protocol to send a second message having a second private transport address to the second device, the second message being suitable for causing the transport address translation entity to make a second association of said second private address with a second "public" address and with the second transport protocol, the second message further containing "correspondence" information that is also contained in the first message and/or in the response to the first message, and that is suitable, once the second device has received the second message, for causing the second public transport address to be put into correspondence with the first public transport address.

In the example envisaged above, the first device is typically a terminal, the second device is a P-CSCF server of an IP core network, and the first and second protocols are selected from the UDP and TCP protocols. Nevertheless, the invention is not limited exclusively to IMS architectures, nor is it limited only to the UDP and TCP transport protocols. It is equally applicable to any other architecture implementing the SIP protocol or an application level protocol that behaves in identical or similar manner, and that requires pieces of equipment that are communicating over the network and that are separated by a NAT entity to switch from one transport mode to another, which transport mode may be UDP, TCP, SCTP, etc.

By means of two messages that are sent to the second device using the first transport mode and using the second transport mode, the invention thus enables the first device to create two open pinholes dynamically with the NAT entity and to maintain them simultaneously, in other words, to have two transport address associations, respectively one for the first transport protocol and the other for the second transport protocol. As a result, it is ensured that the NAT entity can handle requests sent to the first device using either of the two transport modes.

In addition, the public transport addresses used by the two transport protocols are advantageously put into correspondence in the second device. In this way, the second device is capable of correctly handling and routing to the first device a request that is addressed thereto and that arrives at the second device.

This is made possible in accordance with the invention by the first device sending the second message to the second device. This second message has firstly the function of creating an address association (or "binding") with the NAT entity for the second transport mode, and secondly of informing the second device of this address association and of conveying "correspondence" information that enables the second device to put into correspondence the address associations (and more particularly the public address associations) as created for the first and second transport modes. As a result, the second device is capable of correctly managing and directing the requests reaching it that are destined for the first device.

The above-mentioned problems are thus solved by the invention, regardless of whether it is applied in a context where there does or does not exist a difference between the protocol used by the first device for registering with the second device and the protocol used for conveying its registration request. In accordance with the invention, the terminal can be reached using either of the protocols.

In a particular implementation, the method further comprises a sending step of sending a refresh message to the address translation entity to refresh the first address association and/or to refresh the second address association.

These refresh messages (or requests) have the purpose of keeping open (maintaining) the pinholes created by the NAT entity so that the first device can receive requests coming from the second device using either of the protocols.

Furthermore, the response to the first message may advantageously include a refresh period for refreshing the first and/or the second address association.

As mentioned above, the invention relies on the first device causing the NAT entity to activate two address associations using two different transport protocols, and also on the second device putting into correspondence both of the public addresses that are allocated to the first device using each of the two transport protocols.

The invention also provides a method of putting public transport addresses into correspondence, said method being for performing by a "second" device and comprising:

a receive step of receiving a first message transported using a first transport protocol, said first message having as its source transport address a first "public" transport address that has been allocated to a first device by a transport address translation entity placed in series between said first and second devices;

a storage step of storing the first public transport address in association with the first transport protocol and with "correspondence" information;

a send step of sending to the first device a response to the first message;

a receive step of a second message transported using a second transport protocol, said second message having as its source transport address a second public transport address that has been allocated to the first device by the transport address translation entity, the second message including said correspondence information; and a correspondence step of putting the first public transport address into correspondence with the second public transport address by using the correspondence information.

Correspondingly, the invention also provides a second device comprising:

a receive module that is configured to receive a first message transported using a first transport protocol, said first message having as its source transport address a first "public" transport address that has been allocated to a first device by a transport address translation entity placed in series between said first and second devices;

a storage module that is configured to store the first public transport address in association with the first transport protocol and with "correspondence" information;

a send module that is configured to send to the first device a response to the first message;

a receive module that is configured to receive a second message transported using a second transport protocol, said second message having as its source transport address a second "public" transport address that has been allocated to the first device by the transport address translation entity, the second message including said correspondence information; and a correspondence module that is configured to put the first public transport address into correspondence with the second public transport address by using the correspondence information.

The method of putting addresses into correspondence and the second device benefit from the same advantages as described above for the method of maintaining address associations and for the first device.

In a particular implementation, the first message is a request for registering the first device with the second device; and/or the second message is a message for refreshing an address association with the address translation entity.

Thus, by way of example, when the second protocol is the UDP protocol, the second message is a STUN binding request (SBR) that is empty (i.e. with no message content or with a minimum message that is not intrusive, i.e. that is insignificant) using the simple transversal of UDP through NATs (STUN) protocol and suitable for refreshing the address association created in the NAT entity for the first device for use with the second protocol.

In another example, when the second protocol is the TCP protocol, the second message is a message for refreshing an address association for the TCP protocol using the mechanism described in the document RFC 6223 entitled "Indication of support for keep-alive", April 2011, and that comprises two carriage-return and line-feed (CLRF) sequences.

Thus, in this particular implementation, the invention takes advantage of message formats that already exist in conventional transport protocols, and therefore does not require new message formats to be introduced, firstly for causing the NAT entity to make the address associations using both of the protocols, and secondly for conveying the correspondence information that enables the second device to connect the public transport address using the first protocol with the public transport address using the second protocol.

This correspondence information may be generated either by the first device or by the second device. It is preferably an identifier that is unique for the second device both in space and in time, at least for the duration of registration of the first device with the network, so that the second device can put the first public address unambiguously into correspondence with the second public address. By way of example, this correspondence information is a string of random characters or a universal unique identifier (UUID).

Thus, in a particular implementation, the correspondence information is generated by the second device (e.g. on receiving the first message) and is inserted thereby into the response to the first message.

The presence of the correspondence information in the response to the first message and in the second message makes it easy to put the first public source transport address of the first message into correspondence with the second public source transport address of the second message.

In the example of the second protocol being UDP and the second message relying on an empty SBR request, the correspondence information may in particular be a string of numeric characters generated by the second device and then inserted by the first device into a "Transaction-Id" field of a header of the SBR request.

In the example of the second protocol being TCP, it is possible to envisage that the second message contains a dummy response in compliance with a session control protocol, this dummy response including the correspondence information. The session control protocol in question is preferably the SIP protocol.

In this way, application information is introduced into the refresh messages that are already specified by the UDP and TCP protocols, which application information enables the second device to put into correspondence the public addresses that have been allocated by the NAT entity to the first device for these two protocols.

In another implementation, the correspondence information comprises the first public transport address allocated to the first device, this first public transport address being inserted in the response to the first message by the second device.

In other words, in this implementation, information that has already been returned in conventional manner by the second device in its response message using the SIP protocol is used as soon as the second device has detected the presence of a NAT entity in series in the stream of messages it is exchanging with the first device. Such detection can be performed easily, in known manner, by analyzing the various transport addresses specified in the header of the first message reaching the second device.

In this implementation, when the second protocol is the UDP protocol, the correspondence information can then be inserted by the first device into a field of the refresh SBR request that has a format identical to a MAPPED-ADDRESS field or an XOR-MAPPED-ADDRESS field as defined by the STUN protocol.

Such a field is already conventionally used in the STUN protocol for conveying this type of information in the network-to-terminal direction. In this implementation, the invention proposes using a similar field for conveying the same type of information in the terminal-to-network direction.

By re-using existing information and/or message formats already specified by the transport protocols, implementation of the invention is greatly simplified.

In another implementation, the correspondence information may be generated by the first device and may be inserted by the first device into the first message in order to be transmitted to the second device.

By way of example, it may be information that is already transmitted in the messages from the first device independently of the invention, such as for example a transaction or session identifier.

In the example of the UDP protocol and of the empty SBR request used for the second message, such correspondence information can subsequently be easily inserted by the first device into a REALM, NONCE, or SOFTWARE attribute of the SBR request.

In a particular implementation, the various steps of the method for maintaining an address association and/or of the method for putting addresses into correspondence are determined by computer program instructions.

Consequently, the invention also provides a computer program on a data medium, the program being suitable for being performed in a first device or more generally in a computer, the program including instructions adapted to performing steps of a method for maintaining an address association as described above.

The invention also provides a computer program on a data medium, the program being suitable for being performed in a second device, or more generally in a computer, the program including instructions adapted to performing steps of a method for putting addresses into correspondence, as described above.

Each of these programs may use any programming language, and may be in the form of source code, object code, or code intermediate between source code and object code, such as in a partially compiled form, or in any other desirable form.

The invention also provides a computer readable data medium including computer program instructions as mentioned above.

The data medium may be any entity or device capable of storing the program. For example, the medium may comprise storage means, such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program of the invention may in particular be downloaded on an Internet type network.

Alternatively, the data medium may be an integrated circuit in which the program is incorporated, the circuit being adapted to execute or to be used in the execution of the method in question.

The invention also provides a communications system comprising:
a first device of the invention;
a second device of the invention; and
a transport address translation entity placed in series between the first device and the second device.

Furthermore, in a particular embodiment:
the first and second protocols are distinct protocols that may be selected from the TCP, UDP, and SCTP protocols in particular; and/or
the first device is a terminal and the second device is an entry point to a core network with which the first device needs to register in order to access the core network.

In other implementations, it is also possible to envisage that the method for maintaining address associations, the method for putting addresses into correspondence, the first and second devices, and the communication system of the invention present in combination some or all of the above-specified characteristics.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF THE INVENTION

Figure 1:
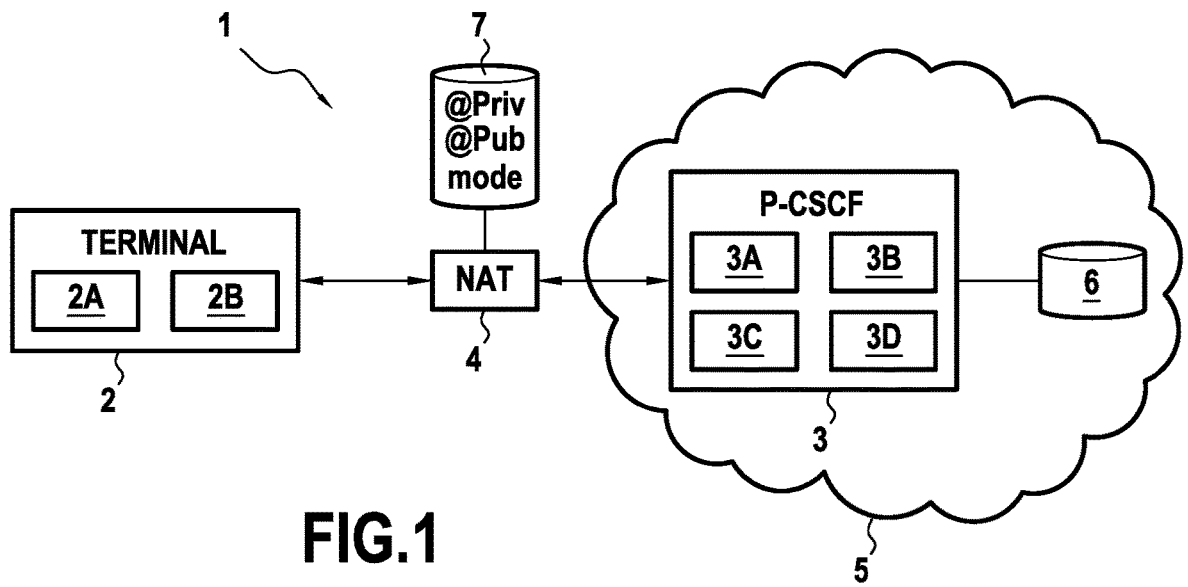
FIG. 1 is a diagram of a communications system in accordance with the invention in a particular embodiment.

FIG. 1 shows a communications system 1 in accordance with the invention in its environment.

The communications system 1 comprises:
a first device 2 in accordance with the invention;
a second device 3 in accordance with the invention; and
a NAT entity 4 placed in series between the first device 2 and the second device 3.

In the example shown in FIG. 1, the first device 2 is a mobile terminal (e.g. a smartphone, a digital tablet, a programmable computer, etc.) hosting a plurality of applications, such as for example TCS, VoLTE, etc. applications that rely on functions made available by an IP core network 5.

In this example, the IP core network 5 implements an IMS architecture using the session initiation protocol SIP. Such an architecture is known to the person skilled in the art and is described by way of example in 3GPP documents TS 23.228 and TS 24.229. Nevertheless, this assumption is not itself limiting, and it is possible to envisage other architectures, e.g. such as a proprietary architecture, etc.

The second device 3 is a P-CSCF server of the IP core network 5 as described in above-mentioned 3GPP documents TS 23.228 and TS 24.229, and is not described in greater detail herein, with the exception of the characteristics this server performs in accordance with the invention.

In order to be able to operate over the IP core network 5, it is known that the various applications hosted by the terminal 2 need to register beforehand therewith. This registration is managed by the P-CSCF server 3, and is performed by the terminal 2 sending a SIP RESISTER request to the P-CSCF server 3 and containing in particular the multimedia characteristics (or "feature tags") that are supported by these applications. The registration contexts of terminals with the core network 5 are stored by the P-CSCF server 3 in a database 6.

The NAT entity 4 that is connected in series between the terminal 2 and the P-CSCF server 3 in this example is a network address and port translation (NAPT) entity suitable for associating a "private" (or internal) transport address of the terminal 2 with a "public" (or external) transport address for a given transport mode, such as for example TCP, UDP, or SCTP. In this example, such a transport address consists in a combination of an IP address and a port. Nevertheless, it should be understood that the invention applies equally to a transport address identified solely by an IP or network address.

The association (public IP address, public port, private IP address, private port, transport mode) created by the terminal 2 is stored in a database 7 maintained by the NAT entity 4. The creation of such an association makes it possible to open a "pinhole" in the NAT entity 4; in other words, all requests coming from the core network 5 and transported using the public transport address as destination and a transport mode registered by the NAT entity 4 for the terminal 2 are conveyed thereby to the terminal 2 using the associated private transport address. Conversely, the NAT entity 4 translates the private source transport address of a message coming from the terminal 2 into the public source transport address associated therewith in the database 7.

In the presently-described implementation, it is assumed that under such circumstances a message is sent by a terminal (and a fortiori by the terminal 2) to the core network 5 with a source transport address and using a transport protocol, this message being suitable for causing the NAT entity 4 to open a pinhole (in other words, the terminal is authorized to access the network) assuming that an association of IP transport addresses does not already exist for the terminal in the database 7 for this source transport address and this transport protocol.

Figure 2:
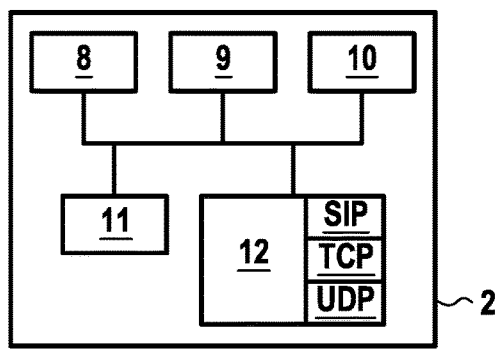
FIGS. 2 and 3 show respectively the hardware architecture of a first device and of a second device in accordance with the invention, in a particular embodiment.

In the presently-described embodiment, the terminal 2 has the hardware architecture of a computer, as shown diagrammatically in FIG. 2.

The terminal 2 comprises in particular a processor 8, a ROM 9, a random access memory (RAM) 10, a non-volatile memory 11 in which the applications hosted by the terminal 2 are stored, and a communications module 12.

The communications module 12 serves in particular to enable the terminal 2 to communicate with the core network 5 and in particular with the P-CSCF server 3. For this purpose, this communications module 12 has a stack of protocols including in particular the session initiation protocol SIP and the transport protocols UDP and TCP, together with other protocols conventionally used for communicating over a network.

It should be observed that the invention is not limited to the above-mentioned protocols and that other protocols could be envisaged, such as for example the SCTP protocol.

The ROM 9 of the terminal 2 constitutes a data medium in accordance with the invention that is readable by the computer 8 and that stores a computer program in accordance with the invention, including instructions for executing steps of a method of the invention for maintaining an association, which steps are described below in greater detail.

In equivalent manner, the computer program defines functional modules of the terminal 2 (and specifically software modules) and in particular a first module 2A for sending and receiving messages using a first transport protocol (e.g. TCP in this example) and a second module 2B for sending and receiving messages using a second transport protocol (e.g. UDP in this example). The functions performed by these modules are described in greater detail below with reference to FIGS. 4 to 6.

Figure 3:
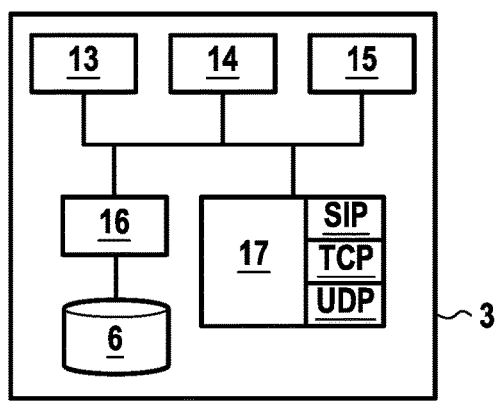

In similar manner, in the presently-described embodiment, the P-CSCF server 3 has the hardware architecture of a computer, as shown diagrammatically in FIG. 3.

It comprises in particular a processor 13, a ROM 14, a RAM 15, a non-volatile memory 16 storing the context database 6, and a communications module 17.

The communications module 17 serves in particular to enable the P-CSCF server 3 to communicate with other entities of the core network 5 (not shown in FIG. 1) and with terminals managed by this core network, such as for example the terminal 2. For this purpose the communications module 17 has a stack of protocols including in particular the session initiation protocol SIP and the transport protocols UDP and TCP, together with other protocols conventionally used for communicating over a network.

It should be observed that the invention is naturally not limited to the above-mentioned protocols, and that other protocols could be envisaged, such as for example the SCTP protocol.

The ROM 14 of the P-CSCF server 3 constitutes a data medium in accordance with the invention that is readable by the processor 13 and that stores a computer program in accordance with the invention, including instructions for executing steps of a method of the invention for putting addresses into correspondence, which steps are described in greater detail below.

The computer program defines in equivalent manner functional modules (and specifically software modules in this example) of the P-CSCF server 3, and in particular a module 3A for sending and receiving messages to and from the terminal 2 using a first transport protocol (TCP in this example), a module 3B for storing public transport addresses used by the terminal 2 in the context of the terminal as stored in the database 6, a module 3C for sending and receiving messages to and from the terminal 2 using a second transport protocol (UDP in this example), and a module 3D for putting public addresses into correspondence. The functions performed by these modules are described in greater detail below with reference to FIGS. 4 to 6.

Figure 4:
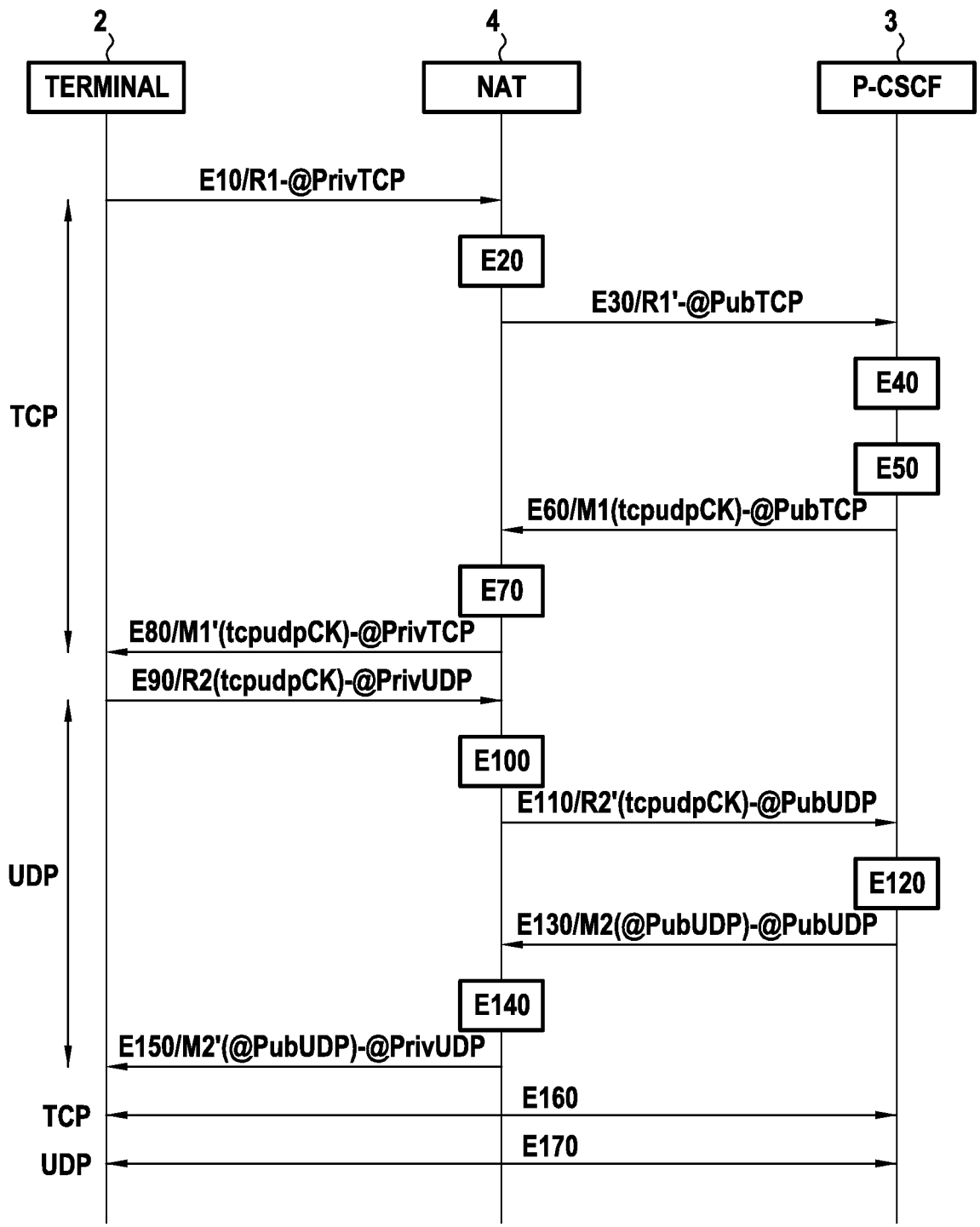
FIGS. 4 to 6 show the main steps of methods of the invention for maintaining associations and for putting addresses into correspondence in various implementations, when the methods are performed by the communications system of FIG. 1.
Figure 5:
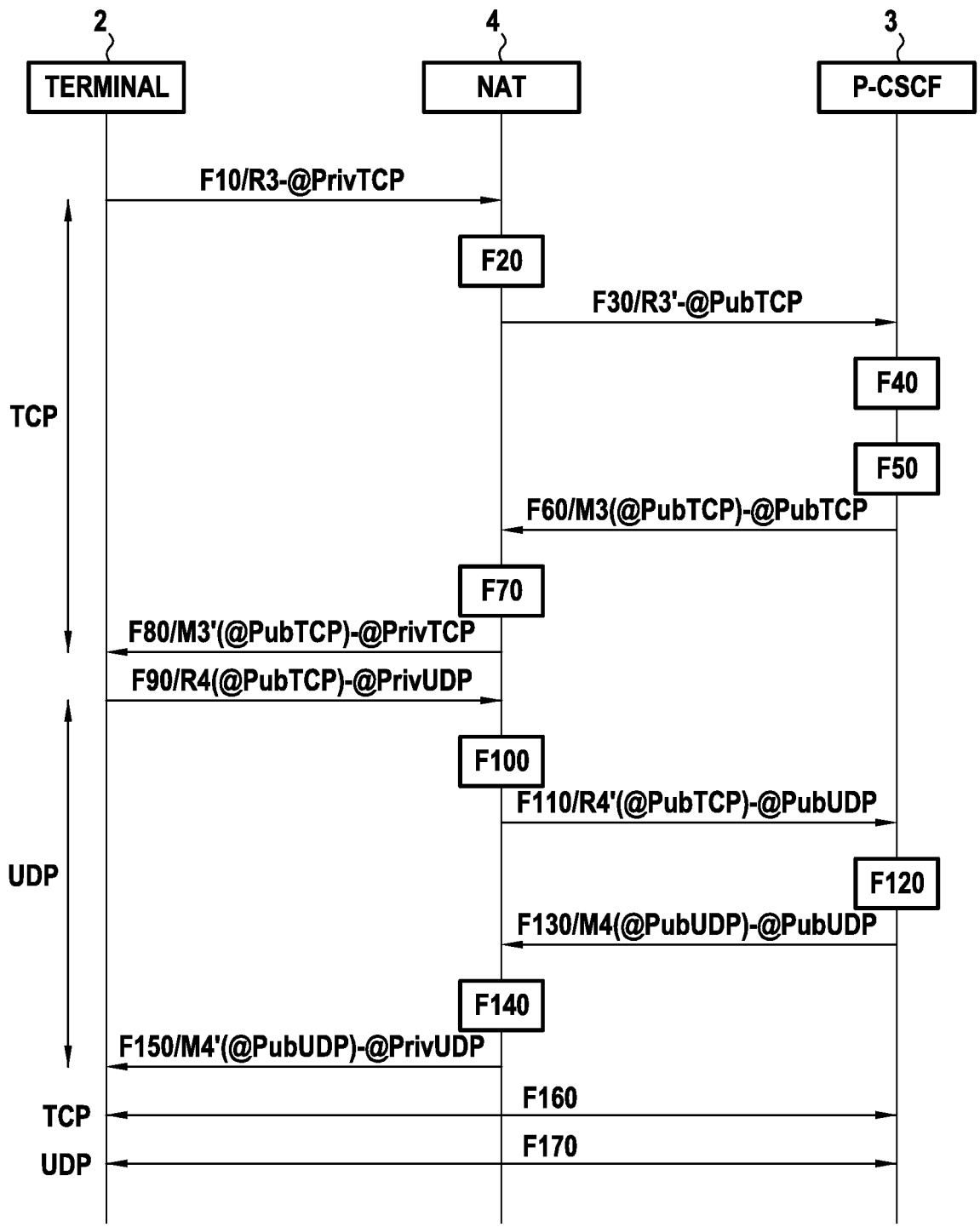
Figure 6:
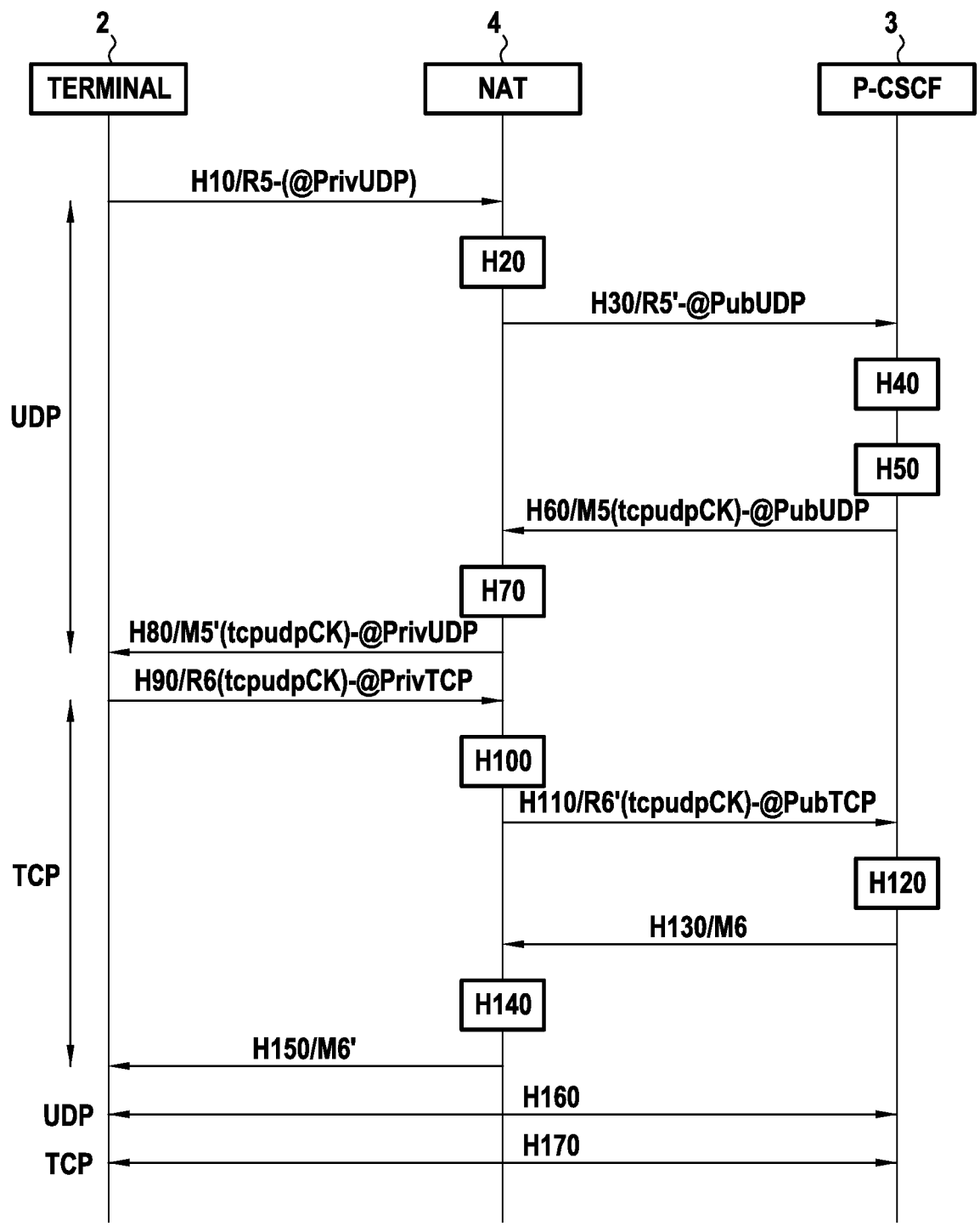

With reference to FIGS. 4 to 6, there follows a description of various implementations of the method of the invention, and in particular of the steps of the methods of the invention for maintaining associations and for putting addresses into correspondence when the invention is applied to two distinct sets of circumstances:

first set of circumstances: the terminal 2 registers with the P-CSCF server 3 using a transport mode (e.g. TCP) that is different from the mode on which it desires to be contacted (e.g. UDP), e.g. for the reasons set out above, i.e. the terminal 2 is configured by default to use the UDP protocol for transmitting and receiving, but for example because of the number of applications seeking to register with the core network 5, the registration request sent by the terminal 2 exceeds the maximum size authorized for using this protocol, so the terminal 2 needs to switch over to a TCP transport mode. There thus exists a difference in this first set of circumstances between the transport mode specified in the request for contacting the terminal 2 and the transport mode on which this request is received by the P-CSCF server 3; and second set of circumstances: the terminal 2 registers using a transport mode (e.g. UDP) that is consistent with the mode on which it desires to be contacted.

FIG. 4 shows the main steps of a method for maintaining associations and a method for putting addresses into correspondence as performed respectively by the terminal 2 and by the server 3 in a first implementation applied to the above-mentioned first set of circumstances.

It is assumed in the example shown in FIG. 4 that the terminal 2 uses its module 2A to send a SIP REGISTER registration request R1 to the P-CSCF server 3 (step E10) containing the following Via and Contact fields in its header:
Via: SIP/2.0/TCP IPadr_priv:port_privTCP;
branch=z9hG4bKZ8WlyYt8la; keep
Contact: userpart@IPadr_priv:port_privUDP; transport=udp;
where:

IPadr_priv is the private IP address of the terminal 2 (used for both the UDP and the TCP protocols);

port_privTCP is the private port of the terminal 2 for the TCP protocol; and port_privUDP is the private port of the terminal 2 for the UDP protocol.

The private IP address IPadr_priv and the private port port_privTCP in this example constitute the private transport address @PrivTCP of the terminal 2 for the TCP transport protocol. In similar manner, the private IP address IPadr_priv and the private port port_privUDP constitute the private transport address @PrivUDP of the terminal 2 for the UDP transport protocol.

In other words, the request R1 is sent using the TCP protocol, having as its transport address the private transport address @PrivTCP (as mentioned in the Via field of the header), even though the terminal 2 seeks to be contacted using a transport address using the UDP protocol (as mentioned in the Contact field of the header).

The request R1 is intercepted by the NAT entity 4 placed in series between the terminal 2 and the P-CSCF entity 3 (step E20), and causes the NAT entity 4 to open a pinhole for the terminal 2 for the TCP protocol.

More precisely, on receiving the request R1, the NAT entity 4 acts in known manner to create an association (or "binding") in its database 7 between the source private transport address @PrivUDP of the request R1 and a public transport address @PubTCP that is allocated dynamically to the terminal 2 for the TCP protocol. This public transport address @PubTCP is constituted by a public IP address IPadr_pubTCP and a public port port_pubTCP. In other words, the NAT entity 4 stores a quintuplet for the terminal 2 in its database 7, which quintuplet comprises:

the private IP address IPadr_priv of the terminal 2;

the private port port_privTCP of the terminal 2 for TCP;

the public IP address IPadr_pubTCP allocated to the terminal 2 for TCP;

the public port port_pubTCP allocated to the terminal 2 for TCP; and an identifier of the transport mode used, specifically the TCP protocol in this example.

Thereafter, the NAT entity 4 transfers the request R1 to the P-CSCF server 3 in known manner in the form of a request R1' sent using the transport address @PubTCP (step E30).

This request R1' is received by the P-CSCF server 3 via its module 3A with @PubTCP as the source transport address.

In its database 6, the P-CSCF server 3 creates a context of the terminal 2 in which, by using its module 3B, it stores data in addition to the other data conventionally stored by a P-CSCF server when registering a terminal, which data comprises the public transport address @PubTCP allocated by the NAT entity 4 to the terminal 2 (including the public IP address and the public port), the transport mode that is being used (TCP in this example), and the address of contact specified by the terminal in the Contact field (step E40).

Thereafter, by analyzing the Via field of the header of the request, and by comparing the transport IP address (@PrivTCP) mentioned in this field with the source transport address (@PubTCP) of the request R1', it detects that a NAT entity is present between the terminal 2 and itself (step E40).

After detecting this, and in the first implementation described herein, the P-CSCF server generates "TCP/UDP correspondence" information referred to below in this description as tcpudpCK (step E50). In this example, the correspondence information is a string of numerical characters of predetermined size (e.g. 96 bits), generated randomly by the P-CSCF server 3, and that is unique for the P-CSCF server both in space and in time (at least for the time the terminal 2 is registered). In SIP terminology, such a string of numerical or alphanumerical characters is also known as a "cookie". By way of example, it is a unique universal identifier (UUID). In the presently-envisaged example, this correspondence information is given the value 345345345387.

This correspondence information is stored by the P-CSCF server 3 in the context of the terminal 2 in association with the transport address @PubTCP.

Thereafter, the P-CSCF server 3 sends a SIP 200 OK response to the registration request of the terminal 2 over the TCP protocol while using the public transport address @PubTCP, via its own module 3A. Prior to this response, referenced herein as "M1", it inserts the TCP/UDP correspondence information tcpudpCK in a tcpudpCK parameter of the Via field that is provided for this purpose (step E60). The header of this M1 response thus comprises in particular the following Via and Contact headers:
Via: SIP/2.0/TCP IPadr_privTCP:port_privTCP;
branch=z9hG4bKZ8WlyYt8la; keep=60; tcpudpCK=345345345387;
keeptcp=600; keepudp=60; rport=port_pubTCP;
received=IPadr_pubTCP
Contact: userpart@IPadr_privUDP:port_privUDP;
transport=udp; expires=3600

The elements added by the P-CSCF server 3 are marked above in bold characters in order to make them easier to identify. In particular, in the first implementation described herein the P-CSCF server 3 has inserted the correspondence information tcpudpCK=345345345387 in the Via header of the response M1, together with values for refresh durations "keeptcp" and "keepudp" of the NAT association with the NAT entity 4 for the two protocols TCP and UDP respectively. Since the P-CSCF server 3 has detected the presence of the NAT entity 4, it also indicates in its response to the terminal 2 and using the SIP protocol, the public transport address @PubTCP in the attributes "rport" and "received". Finally, the registration duration "expires" is given in the Contact field.

The response M1 is intercepted by the NAT entity 4, which translates the public transport address @PubTCP into the private transport address @PrivTCP using the association stored in its database 7 (step E70), prior to transferring the response M1' that results therefrom to the terminal 2 (step E80).

On receiving the response M1' via its module 2A, the terminal 2 stores the correspondence information tcpudpCK in memory and is in a position to determine that a NAT entity is present between the P-CSCF server 3 and itself, together with the public transport address that has been allocated thereto by that entity for the TCP port.

Thereafter, it sends a new request R2 to the P-CSCF server 3, this time using the UDP protocol, this request R2 having as its source transport address the UDP private transport address @PrivUDP of the terminal 2 (step E90).

In the first embodiment described herein, this request R2 is a STUN binding request (SBR) for refreshing a UDP address association created with a NAT entity, using the STUN protocol. The STUN protocol is a protocol that is known and described in particular in the document RFC 5389, published in October 2008 by the IETF.

More precisely, this request R2 is an empty SBR request (i.e. without any message content or with minimum content that is insignificant and not intrusive), into which the terminal 2, using its module 2B, inserts the correspondence information tcpudpCK that it has received from the P-CSCF server 3 in the response message M1'.

In this example, the correspondence information tcpudpCK is inserted in a Transaction ID attribute of the SBR request, with the size and the nature (integer coded on 96 bits) of this attribute being compatible with the size of the correspondence information. It should be observed that such an attribute is conventional to this type request, such that the invention, in this implementation, does not require any new attribute to be introduced, and remains compatible with the mechanisms described in the document RFC 5626 entitled "Managing client-initiated connections in the session initiation protocol", as published by the IETF.

In a variant, a new attribute may be created for conveying the correspondence information in the SBR request. In yet another variant, another type of request may be used for the request R2.

In other words, in the first embodiment of the invention, the terminal 2 uses its module 2B to insert application information in the SBR refresh request, namely the correspondence information tcpudpCK.

This request R2 is intercepted by the NAT entity 4 located in series between the terminal 2 and the P-CSCF server 3, and it causes the NAT entity 4 to open a pinhole for the terminal 2, this time for the UDP protocol (step E100).

More precisely, on receiving the request R2, the NAT entity 4 acts in known manner to create an association (or "binding") in its database 7 between the private source transport address @PrivUDP of the request R2 and a public transport address @PubUDP dynamically allocated to the terminal 2 for the UDP protocol. This public transport address @PubUDP is constituted by a public IP address IPadr-pubUDP and a public port port_pubUDP. In other words, the NAT entity 4 stores a new quintuplet for the terminal 2 in its database 7, this quintuplet comprising:

the private IP address IPadr_priv of the terminal 2;
the private port port_privUDP of the terminal 2 for UDP;
the public IP address IPadr_pubUDP allocated to the terminal 2 for UDP;
the public port port_pubUDP allocated to the terminal 2 for UDP; and
an identifier of the transport mode used, specifically in this example the UDP protocol.

Thus, the effect of the request R2 is to create and maintain in the NAT entity 4 an address association for the terminal 2 for the UDP protocol that is in addition to the address association that was created in response to the request R1 for the TCP protocol. In other words, after receiving the requests R1 and R2, the NAT entity 4 possesses simultaneously two address associations for the terminal 2, respectively for the TCP protocol and for the UCP protocol.

Thereafter, the NAT entity 4 transfers the request R2 to the P-CSCF server 3 in conventional manner in the form of a request R2' having as its source transport address the public transport address @PubUDP (step E110).

This request R2' is received by the P-CSCF server 3 via its module 3C.

The P-CSCF server 3 uses its module 3D to extract the correspondence information tcpudpCK from the request R2'. Thereafter, it uses this correspondence information to put the public source transport address @PubUDP of the request R2' into correspondence with the public source transport address @PubTCP of the request R1' (step E120). It then stores the transport address @PubUDP in the context of the terminal 2 that is stored in the database 6 in association with the public transport address @PubTCP.

Thus, by putting addresses into correspondence in this way, as triggered by the presence of the correspondence information tcpudpCK in the request R2', the P-CSCF server 3 cannot only determine which terminal 2 is associated with the public transport address @PubUDP of the request R2', but can also make the link with the TCP address association already present for this terminal in the database 6. As a result, the P-CSCF server 3 is capable from this moment on of transmitting messages to the terminal 2 without difficulty, whether they are messages coming from the core network 5 or its own messages.

Using its module 3C, it sends a response SBResp to the terminal 2 at the public transport address @PubUDP, which message has a MAPPED-ADDRESS or an XOR-MAPPED attribute containing the public transport address @PubUDP of the request R2' (step E130). This response is written M2.

The response M2 is intercepted by the NAT entity 4, which translates the public transport address @PubUDP into the private transport address @PrivUDP using the association stored in its database 7 (step E140), prior to transferring the response M2' that results therefrom to the terminal 2 (step E150).

On receiving the response M2' via its module 2B, the terminal 2 can determine which public transport address has been allocated thereto by the NAT entity 4 for the UDP protocol.

Thereafter, by using its modules 2A and 2B respectively, the terminal 2 sends refresh requests to the P-CSCF server 3 for the address associations that have been allocated thereto for the TCP and the UDP protocols (steps E160 and E170, respectively), these requests being sent periodically (with the periods as specified by the P-CSCF server 3 in the response M1).

For the TCP protocol, such a request comprises, in known manner and in compliance with the refresh (or "keep alive") mechanism described in the above-mentioned document RFC 6223, two carriage-return and line-feed (CRLF) sequences, whereas for the UDP protocol it is constituted by an SBR request that is empty or that has insignificant content, as mentioned above.

FIG. 5 shows the main steps of a configuration method and of a method of putting addresses into correspondence as they are performed respectively by the terminal 2 and the server 3 in a second implementation applied to the first above-mentioned set of circumstances (i.e. there is a difference between the transport protocol on which the server 3 receives the registration request from the terminal 2 and the transport protocol on which the terminal seeks to be contacted, as indicated in the request).

In the example shown in FIG. 5, it is assumed that the terminal 2 uses its module 2A to send a SIP REGISTER registration request R3 to the P-CSCF server 3 (step F10) that contains the following Via and Contact fields in its header:
Via: SIP/2.0/TCP IPadr_priv:port_privTCP; branch=z9hG4bKZ8WlyYt8la; keep
Contact: userpart@IPadr_priv:port_privUDP; transport=udp
where:
IPadr_priv designates the private IP address of the terminal 2 (used for both the UDP and the TCP protocols);
port_privTCP designates the private port of the terminal 2 for the TCP protocol; and
port_privUDP designates the private port of the terminal 2 for the UDP protocol.

The private IP address IPadr-priv and the private port port_privTCP in this example constitute the private transport address @PrivTCP of the terminal 2 for the TCP transport protocol. In similar manner, the private IP address IPadr_priv and the private port port_privUDP constitute the private transport address @PrivUDP of the terminal 2 for the UDP transport protocol.

In other words, as in the first implementation described with reference to FIG. 4, the request R3 is sent using the TCP protocol using as its source transport address the private transport address @PrivTCP (as mentioned in the Via field of the header), even though the terminal 2 seeks to be contacted on a transport address using the UDP protocol (as mentioned in the Contact field of the header).

The request R3 is intercepted by the NAT entity 4 placed in series between the terminal 2 and the P-CSCF entity 3 (step F20), and it causes the NAT entity 4 to open a pinhole for the terminal 2 for the TCP protocol. The NAT entity 4 transfers the request R3 to the P-CSCF server 3 in the form of a request R3' with, as its source transport address, the transport address @PubTCP that results from opening the pinhole (step F30). Since steps F20 and F30 are identical respectively to steps E20 and E30 as described for the first implementation, they are not described in further detail herein.

The request R3' is received by the P-CSCF server 3 via its module 3A, which creates in its database 6, a context for the terminal 2 in which it stores the public transport address @PubTCP allocated to the terminal 2 (including the public IP address IPadr_pubTCP and the public port port_pubTCP), the transport mode used (specifically TCP), and the contact address specified by the terminal in the Contact field (step F40). As in the first implementation, it also detects that a NAT entity is present between the terminal 2 and itself, and that there is a difference between the TCP transport protocol used by the terminal 2 to send the request R1 and the UDP transport protocol mentioned in the request for contacting the terminal 2. The step F40 is identical to the above-described step E40.

In the second implementation as presently described, after performing this detection, the P-CSCF server 3 uses its module 3A to send a SIP 200 OK response (referenced M3) to the registration request from the terminal 2, using the TCP protocol with the public transport address @PubTCP. The header of the response M3 includes in particular the following Via and Contact headers:
Via: SIP/2.0/TCP IPadr_privTCP:port_privTCP; branch=z9hG4bKZ8WlyYt8la; keep=60; keeptcp=600; keepudp=60; rport=port_pubTCP; received=IPadr_pubTCP
Contact: userpart@IPadr_privUDP:port_privUDP; transport=udp; expires=3600

The elements added by the P-CSCF server 3 are marked above in bold characters in order to make them easier to identify. In particular, in the second presently-described implementation, the P-CSCF server 3 has inserted refresh duration values "keeptcp" and "keepudp" in the header Via of the response M3 for the NAT associations at the NAT entity 4, respectively for each of the TCP and UDP protocols.

Since the P-CSCF server 3 has also detected the presence of the NAT entity 4, it also gives the source transport address of the request R3' in its response to the terminal 2, in the attributes "rport" and "received". In the presently-described second implementation, it is the information contained in these attributes "rport" and "received" that is used as correspondence information in the meaning of the invention. The storing of this correspondence information in the context of the terminal 2 is thus implicit, since it involves the public transport address of the terminal 2 that has already been stored by the P-CSCF server 3 during step F40.

Finally, the registration duration "expires" is given in the Contact field.

The response M3 is intercepted by the NAT entity 4, which translates the public transport address @PubTCP into the private transport address @PrivTCP using the association stored in its database 7 (step F70) before transferring the resulting response M3' to the terminal 2 (step F80).

On receiving the response M3' via its module 2A, the terminal 2 is in a position to determine that a NAT entity is present between the P-CSCF server 3 and itself, and also the public transport address that has been allocated thereto by that entity for the TCP port.

Thereafter, it sends a new request R4 to the P-CSCF server 3, this time using the UDP protocol, with this request R4 having as its source transport address the UDP private transport address @PrivUDP of the terminal 2 (step F90).

Like the request R2 in the first implementation, this request R4 is an SBR request for refreshing a UDP address association using the STUN protocol. In other words, it is an empty SBR request (i.e. having no message content or having insignificant minimum content).

In accordance with the invention, the terminal 2 uses its module 2B to insert into this request the correspondence information that it has received from the P-CSCF server 3 in the response message M3'. In this presently-described second implementation, this is the TCP public transport address @PubTCP contained in the attributes "rport" and "received" of the Via field of the message M3'.

For this purpose, this address is conveyed in the request R4 by using an attribute of format identical to the format of the MAPPED-ADDRESS or XOR-MAPPED-ADDRESS attributes that are already defined by the STUN protocol, e.g. referred to as NAT-MAPPED-ADDRESS. The attributes MAPPED-ADDRESS or XOR-MAPPED-ADDRESS in the STUN protocol are used in the network-to-terminal direction in response to SBR requests, as described in the document RFC 5389.

In a variant, another attribute format could be defined for conveying the correspondence information constituted by the TCP public transport address @PubTCP.

The request R4 is intercepted by the NAT entity 4 connected in series between the terminal 2 and the P-CSCF server 3, and it causes the NAT entity 4 to open a pinhole for the terminal 2, this time for the UDP protocol (step F100). Step F100 takes place identically to above-described step E100.

More precisely, on receiving the request R4, the NAT entity 4 acts in known manner to create an association (or "binding") in its database 7 between the private source transport address @PrivUDP of the request R4 and a public transport address @PubUDP that is dynamically allocated to the terminal 2 for the UDP protocol. This public transport address @PubUDP is constituted by a public IP address IPadr_pubUDP and by a public port port_pubUDP. In other words, the NAT entity 4 stores a new quintuplet for the terminal 2 in its database 7, this quintuplet comprising:

the private IP address IPadr_priv of the terminal 2;
the private port port_privUDP of the terminal 2 for UDP;
the public IP address IPadr_pubUDP allocated to the terminal 2 for UDP;
the public port port_pubUDP allocated to the terminal 2 for UDP; and
an identifier of the transport mode in use, specifically in this example the UDP protocol.

Thus, the effect of the request R4 is to create and to maintain in the NAT entity 4 an address association for the terminal 4 for the UDP protocol that is in addition to the address association created in response to the request R3 for the TCP protocol. In other words, after receiving the requests R3 and R4, the NAT entity 4 has available simultaneously two address associations for the terminal 2, respectively one for the TCP protocol and the other for the UDP protocol.

Thereafter, the NAT entity 4 transfers the request R4 to the P-CSCF server 3 in known manner in the form of a request R4' having as its source transport address the public transport address @PubUDP (step F110).

This request R4' is received by the P-CSCF server 3 via its module 3C.

The P-CSCF server 3 uses its module 3D to extract from the request R4' the correspondence information that is constituted by the public transport address @PubTCP. Thereafter, it uses this correspondence information stored in the database 6 to put the source transport address @PubUDP of the request R4' into correspondence with (i.e. to associate it with) the source transport address @PubTCP of the request R3' (step F120). It then stores the transport address @PubUDP in the context of the terminal 2 stored in the database 6 in association with the public transport address @PubTCP.

Thus, by putting addresses into correspondence in this way, as triggered by the presence of the correspondence information @PubTCP in the request R4', the P-CSCF server 3 cannot only determine which terminal 2 is associated with the public transport address @PubUDP in the request R4', but can also make the link with the TCP address association that it already has for that terminal in the database 6. As a result, the P-CSCF server 3 is capable from this moment on of transmitting without difficulty messages to the terminal 2 by using either one of the UDP and the TCP protocols and regardless of whether the messages come from the core network 5 or are its own messages.

The step F120 is followed by a step F130 of the P-CSCF server 3 sending an SBResp response M4 to the terminal 2 at the public transport address @PubUDP and containing, in a MAPPED-ADDRESS or an XOR-MAPPED attribute, the public transport address @PubUDP, by a step F140 of this response being intercepted by the NAT entity 4, and by a step F150 of the response M4' corresponding to the response M4 being transferred while using the transport address @PrivUDP, and by refresh steps F160 and F170, which steps are respectively identical to the steps E130, E140, E150, E160, and E170 described above for the first implementation.

In the first and second implementations, the correspondence information used is information inserted by the P-CSCF server 3 into its response to the registration request from the terminal 2. This correspondence information is either information generated for this purpose by the P-CSCF server 3, or else information it extracts from the registration request, e.g. the public transport address @PubTCP at which the registration request was sent thereto (in other words the source transport address of the registration request as seen by the P-CSCF server 3).

In a variant, the correspondence information may be generated by the terminal 2. By way of example, it may be a session identifier or a transaction identifier generated in conventional manner by the terminal 2 and inserted by the terminal 2 using the SIP protocol into its registration request, in the first branch of the Via field of the header. This information constitutes an identifier enabling the public transport address of the terminal 2 on the TCP protocol to be put into correspondence unambiguously with the public transport address of the terminal 2 on the UDP protocol. In this variant, the P-CSCF server extracts the transaction or session identifier contained in the first branch of the registration request, stores it in the context of the terminal 2 with the transport address @PubTCP, and then returns it in the message in response to the registration request. The transaction or session identifier is then sent by the terminal 2 in the SBR refresh request, e.g. in a REALM, NONCE, or SOFTWARE attribute defined by the STUN protocol, or in a dedicated attribute. On receiving the SBR request, the P-CSCF server 3 uses the transaction or session identifier to make the link between the addresses @PubUDP and @PubTCP.

FIG. 6 shows the main steps of a configuration method and a method of putting addresses into correspondence as performed respectively by the terminal 2 and by the server 3 in a third implementation applied to the above-mentioned second set of circumstances.

In the example of FIG. 6, it is assumed that the terminal 2 uses its module 2B to send a SIP REGISTER registration request R5 to the P-CSCF server 3 (step H10), and containing the following Via and Contact fields in its header:
Via: SIP/2.0/TCP IPadr_priv:port_privUDP;
 branch=z9hG4bKZ8WlyYt8la; keep
Contact: userpart@IPadr_priv:port_privUDP;
 transport=udp
where IPadr_priv and port_privUDP designate respectively the private IP address and the UDP private port constituting the private transport address @PrivUDP of the terminal 2 for the UDP transport protocol.

In other words, in this third implementation, the request R5 is sent using the UDP protocol having as its source transport address the private transport address @PrivUDP of the terminal 2 (as mentioned in the Via field of the header), and the terminal 2 seeks to be contacted on a transport address using the UDP protocol (as mentioned in the Contact field of the header). There is thus a match between the information conveyed by the registration request R5 and the transport protocol over which the request is conveyed to the server 3.

The request R5 is intercepted by the NAT entity 4 that is connected series between the terminal 2 and the P-CSCF entity 3 (step H20), and that causes the NAT entity 4 to open a pinhole for the terminal 2 using the UDP.

More precisely, on receiving the request R5, the NAT entity 4 acts in known manner to create an association (or "binding") in its database 7 between the private source transport address @PrivUDP of the request R5 and a public transport address @PuvUDP allocated dynamically to the terminal 2 for the UDP protocol. This public transport address @PubUDP is constituted by a public IP address IPadr_pubUDP and by a public port port_pubUDP. In other words, the NAT entity 4 stores a quintuplet in its database 7 for the terminal 2, which quintuplet comprises:

the private IP address IPadr_priv of the terminal 2;
the private port port_privUDP of the terminal 2 for UDP;
the public IP address IPadr_pubUDP allocated to the terminal 2 for UDP;
the public port port_pubUDP allocated to the terminal 2 for UDP; and
an identifier of the transport mode used, specifically in this example the UDP protocol.

Thereafter, the NAT entity 4 transfers the request R5 to the P-CSCF server 3 in conventional manner in the form of a request R5' sent using the transport address @PubUDP as the source address (step H30).

This request R5' is received by the P-CSCF server 3 via its module 3C.

The P-CSCF server 3 creates in its database 6 a context for the terminal 2 in which it uses its module 3B to store data, in addition to other data conventionally stored by a P-CSCF server when registering a terminal, which data comprises the public transport address @PubUDP allocated to the terminal 2 (including the public IP address and the public port), the transport mode in use (UDP in this example), and the contact address specified by the terminal in the Contact field (step H50).

Thereafter, by analyzing the Via field of the header of the request and by comparing the transport address (@PrivUDP) mentioned in this field with the source transport address (@PubUDP) of the request R5', it detects that a NAT entity is present between the terminal 2 and itself (step H40).

After this detection, and in the presently-described third implementation, the P-CSCF server generates TCP/UDP correspondence information referenced herein as tcpudpCK (step H50). In this example, this correspondence information, as in the first implementation, is a string of numerical characters of predetermined size (e.g. 96 bits), generated randomly by the P-CSCF server 3, and it is unique for the P-CSCF server 3 in space and in time. By way of example, its value is equal to 345345345387.

This correspondence information is stored by the P-CSCF server 3 in the context of the terminal 2 in association with the transport address @PubUDP.

Thereafter, the P-CSCF server 3 uses its module 3C to send a SIP 200 OK response to the registration request from the terminal 2 over the UDP protocol and using the public transport address @PubUDP. Prior to this response, given reference M5, it inserts the correspondence information tcpudpCK in a parameter of the Via field provided for this purpose (step H60). The header of this response M5 thus comprises in particular the following Via and Contact headers:

Via: SIP/2.0/TCP IPadr_privUDP:port_privUDP; branch=z9hG4bKZ8WlyYt8la; keep; tcpudpCK=345345345387; keeptcp=600; keepudp=60; rport=port_pubUDP; received=IPadr_pubUDP
Contact: userpart@IPadr_privUDP:port_privUDP; transport=udp; expires=3600

The elements added by the P-CSCF server 3 are marked in bold characters above in order to make them easier to identify.

The response M5 is intercepted by the NAT entity 4, which translates the public transport address @PubUDP into the private transport address @PrivUDP using the associations stored in its database 7 (step H70), prior to transferring the resulting response M5' to the terminal 2 (step H80).

On receiving the response M5' via its module 2B, the terminal 2 stores the correspondence information tcpudpCK in memory and is in a position to determine that a NAT entity is present between the P-CSCF server 3 and itself, and also the public transport address that has been allocated thereto by said entity for the UDP protocol.

Thereafter, using its module 2A, it sends a new request R6 to the P-CSCF server 3, this time using the TCP protocol having as its source transport address the TCP private transport address @PrivTCP of the terminal 2 (step H90).

In the presently-described third implementation, this request R6 is a request to refresh a TCP address association created with a NAT entity, as described in the document RFC 6223.

As described in that document RFC 6223, this request R6 is thus constituted by two CRLF sequences, followed in accordance with the invention by a dummy SIP response (e.g. a SIP 499 response) containing the correspondence information tcpudpCK, e.g. in a "binding-link" parameter of the response. Thereafter, the SIP response is followed by a new CRLF sequence.

It should be observed that the SIP response inserted in the request R6 is dummy in that, properly speaking, it does not respond to any request. This is a way of informing the P-CSCF server 3 to which this message is destined that the server is conveying correspondence information that it needs to use in accordance with the invention. In other words, in this third implementation of the invention, the terminal 2 uses its module 2A to insert application information into the TCP refresh request, specifically the correspondence information tcpudpCK.

This request R6 is intercepted by the NAT entity 4 connected in series between the terminal 2 and the P-CSCF server 3, and it causes the NAT entity 4 to open a pinhole for the terminal 2, this time for the TCP protocol (step H100). This step is identical to the steps E70 and F70 described above with reference to the first and second implementations.

More precisely, on receiving the request R6, the NAT entity 4 acts in known manner to create an association (or "binding") in its database 7 between the private source transport address @PrivTCP of the request R6 and a public transport address @PubTCP dynamically allocated to the terminal 2 for the TCP protocol. This public transport address @PubTCP is constituted by a public IP address IPadr_pubTCP and by a public port port_pubTCP. In other words, the NAT entity 4 stores a new quintuplet in its database 7 for the terminal 2, the quintuplet comprising:

the private IP address IPadr_priv of the terminal 2;

the private port port_privTCP of the terminal 2 for TCP;

the public IP address IPadr_pubTCP allocated to the terminal 2 for TCP;

the public port port_pubTCP allocated to the terminal 2 for TCP; and an identifier of the transport mode in use, specifically in this example the TCP protocol.

Thus, the request R6 has the effect of creating and of maintaining with the NAT entity 4 an address association for the terminal 2 for the TCP protocol that is additional to the address association created in response to the request R5 for the UDP protocol. In other words, after receiving the requests R5 and R6, the NAT entity 4 has available simultaneously two address associations for the terminal 2, respectively one for the TCP protocol and another for the UDP protocol.

Thereafter, the NAT entity 4 transfers the request R6 to the P-CSCF server 3 in conventional manner in the form of a request R6' having as its source transport address the public transport address @PubTCP (step H110).

This request R6' is received by the P-CSCF server 3 via its module 3A.

Via its module 3D, the P-CSCF server 3 identifies the presence of the dummy SIP 499 OK response in the request R6' and extracts therefrom the correspondence information tcpudpCK. Thereafter, it uses this correspondence information to put the source transport address @PubTCP of the request R6' into correspondence with the source transport address @PubUDP of the request R5' (step H120). It then stores the transport address @PubTCP in the context of the terminal 2 stored in the database 6 in association with the transport address @PubUDP.

Thus, by putting addresses into correspondence in this way, as triggered by the presence of the correspondence information tcpudpCK in the request R6', the P-CSCF server 3 cannot only determine which terminal 2 is associated with the public transport address @PubTCP of the request R6', but can also make the link with the UDP address association that it already has for this terminal in the database 6. As a result, the P-CSCF server 3 is capable from this moment on of transmitting messages without difficulty to the terminal 2 using the TCP protocol regardless of whether they come from the core network 5 or are its own messages. In particular, it can manage and transfer to the terminal 2 requests that are of a size greater than the MTU size defined for the UDP protocol, since a TCP port is open on the NAT entity 4 and its available for use.

Using its module 3A, it sends to the terminal 2 a response M6 to the TCP "keep alive" refresh request at the public transport address @PubTCP (step H130).

The response M6 is intercepted by the NAT entity 4, which translates the public transport address @PubTCP into the private transport address @PrivTCP using the association stored in its database 7 (step H140), prior to transferring the resulting response M6' to the terminal 2 (step H150).

Thereafter, by using its modules 2B and 2A respectively, the terminal 2 sends refresh requests to the P-CSCF server 3 for refreshing the address associations that have been allocated thereto for the UDP and TCP protocols (steps H160 and H170 respectively), and it does so periodically at periods specified by the P-CSCF server 3 in the response M5.

It should be observed that the third implementation is described in a variant similar to that used for the first implementation (correspondence information generated by the P-CSCF server 3). Nevertheless, this implementation could equally well be envisaged in combination with the variants described in the second implementation.

The invention claimed is:

1. A method of maintaining transport address associations in a transport address translation entity, by a first device, the transport address translation entity connected in series between the first device and a second device, the method comprising:
    sending, using a first transport protocol, a first message having a first private transport address to the second device, the first message configured to cause the transport address translation entity to make a first association of a first public transport address with the first private transport address and with the first transport protocol; and
    in response to receiving a response to the first message from the second device, sending, using a second transport protocol, a second message having a second private transport address to the second device, the second message configured to cause the transport address translation entity to make a second association of the second private transport address with a second public transport address and with the second transport protocol, resulting in the transport address translation entity having simultaneously the first association and the second association, the second message further containing correspondence information that is also contained in the first message and/or in the response to the first message, and that is configured to, once the second device has received the second message, cause the second public transport address to be placed into correspondence, based on the correspondence information, with the first public transport address at the second device.

2. The method of claim 1, further comprising sending a refresh message to the transport address translation entity to refresh the first association and/or to refresh the second association.

3. The method of claim 1, wherein:
    the first message is a request for registering the first device with the second device; and/or
    the second message is a message for refreshing an address association with the transport address translation entity.

4. The method of claim 1, wherein:
    the second protocol is a transmission control protocol (TCP); and
    the second message is a message for refreshing an address association for the TCP protocol and containing a dummy response using a session control protocol, the dummy response including the correspondence information.

5. The method of claim 1, additionally comprising:
    generating the correspondence information; and
    inserting the correspondence information into the first message.

6. The method of claim 5, wherein the correspondence information is a transaction identifier.

7. The method of claim 6, wherein:
    the second protocol is a user datagram protocol (UDP);
    the second message is an empty STUN binding request (SBR) in accordance with the simple transversal of UDP through NATs (STUN) protocol; and
    the correspondence information is inserted by the first device into a REALM, NONCE, or SOFTWARE attribute of the SBR request.

8. The method of claim 1, wherein the first protocol and the second protocol are distinct protocols selected from transmission control protocol (TCP), user datagram protocol (UDP), and stream control transmission protocol (SCTP).

9. A non-transitory computer-readable medium having stored thereon instructions, which when executed by a processor, cause the processor to perform the method of claim 1.

10. The method of claim 1, wherein the correspondence information is a string of numeric characters generated by the second device and included in the response to the first message, the second protocol is a user datagram protocol (UDP), and the second message is an empty STUN binding request (SBR) using the simple transversal of UDP through NATs (STUN) protocol, the method additionally comprising inserting the correspondence information in a Transaction ID field of a header of the SBR request.

11. A method of putting public transport addresses into correspondence by a second device, the method comprising:
receiving a first message transported using a first transport protocol, the first message having as its source transport address a first public transport address allocated to a first device by a transport address translation entity connected in series between the first and second devices;
storing the first public transport address in association with the first transport protocol and with correspondence information;
sending to the first device a response to the first message;
receiving a second message transported using a second transport protocol, the second message sent in response to the reception by the first device of the response to the first message, the second message having as its source transport address a second public transport address allocated to the first device by the transport address translation entity, such that the transport address translation entity has simultaneously two address associations for the first device, the second message including the correspondence information; and
putting the first public transport address into correspondence with the second public transport address by using the correspondence information.

12. The method of claim 11, additionally comprising:
generating the correspondence information; and
inserting the correspondence information into the response to the first message.

13. The method of claim 12, wherein:
the second protocol is a user datagram protocol (UDP);
the second message is an empty STUN binding request (SBR) using the simple transversal of UDP through NATs (STUN) protocol; and
the correspondence information is a string of numeric characters generated by the second device for insertion by the first device in a Transaction Id field of a header of the SBR request.

14. The method of claim 11, wherein the correspondence information includes the first public transport address, the first public transport address being inserted into the response to the first message by the second device.

15. The method of claim 14, wherein:
the second protocol is a user datagram protocol (UDP);
the second message is an empty STUN binding request (SBR) using the simple transversal of UDP through NATs (STUN) protocol; and
the correspondence information is inserted by the first device into a field of the SBR request having a format that is identical to a MAPPED-ADDRESS or an XOR-MAPPED-ADDRESS field as defined by the STUN protocol.

16. The method of claim 11, wherein the response to the first message further includes a period for refreshing the first and/or the second association.

17. A non-transitory computer-readable data medium having stored thereon instructions, which when executed by a processor, cause the processor to perform the method of claim 11.

18. A first device comprising a processor and a memory storing instructions that, when executed by the processor, cause the processor to:
send, using a first transport protocol, a first message having a first private transport address to a second device, the first message configured to cause a transport address translation entity placed in series between the first device and the second device to make a first association of a first public transport address with the first private transport address and with the first transport protocol; and
in response to reception of a response to the first message from the second device, send, using a second transport protocol, a second message having a second private transport address to the second device, the second message configured to cause the transport address translation entity to make a second association of said second private transport address with a second public transport address and with the second transport protocol, resulting in the transport address translation entity having simultaneously the first association and the second association, the second message further containing correspondence information that is also contained in the first message and/or in the response to the first message, and that is configured to, once the second device has received the second message, cause the second public transport address to be put into correspondence, using the correspondence information, with the first public transport address at the second device.

19. A communications system comprising:
the first device of claim 18;
the second device; and
the transport address translation entity, the second device configured to:
receive the first message transported using the first transport protocol;
store the first public transport address in association with the first transport protocol and with the correspondence information;
send to the first device the response to the first message;
receive the second message transported using the second transport protocol; and
place the first public transport address into correspondence with the second public transport address by using the correspondence information.

20. A second device comprising a processor and a memory storing instructions that, when executed by the processor, cause the processor to:
receive a first message transported using a first transport protocol, said first message having as its source transport address a first public transport address allocated to a first device by a transport address translation entity placed in series between said first and second devices;
store the first public transport address in association with the first transport protocol and with correspondence information;
send to the first device a response to the first message;
receive a second message transported using a second transport protocol, the second message sent in response to reception by the first device of the response to the first message, said second message having as its source transport address a second public transport address allocated to the first device by the transport address translation entity, such that the transport address translation entity has simultaneously two address associations for the first device, the second message including said correspondence information; and put the first public transport address into correspondence with the second public transport address by using the correspondence information.

\* \* \* \* \*